United States Patent
Boussant-Roux et al.

(10) Patent No.: US 8,124,554 B2
(45) Date of Patent: *Feb. 28, 2012

(54) FUSED CAST REFRACTORY BLOCK WITH HIGH ZIRCONIA CONTENT

(75) Inventors: Yves Boussant-Roux, Lexington, MA (US); Edouard Schiavo, Villeneuve les Avignon (FR); Alain Zanoli, Neuilly sur Seine (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 50 days.

This patent is subject to a terminal disclaimer.

(21) Appl. No.: 12/526,675

(22) PCT Filed: Feb. 22, 2008

(86) PCT No.: PCT/FR2008/050304
§ 371 (c)(1),
(2), (4) Date: Oct. 30, 2009

(87) PCT Pub. No.: WO2008/113949
PCT Pub. Date: Sep. 25, 2008

(65) Prior Publication Data
US 2010/0068492 A1 Mar. 18, 2010

(30) Foreign Application Priority Data
Feb. 23, 2007 (FR) .................................. 07 53445

(51) Int. Cl.
*C04B 35/484* (2006.01)
(52) U.S. Cl. ....................................... 501/103; 501/105

(58) Field of Classification Search ........... 501/103–107
See application file for complete search history.

(56) References Cited

U.S. PATENT DOCUMENTS

| | | | |
|---|---|---|---|
| 3,343,593 A | 9/1967 | Goton et al. | |
| 4,461,843 A * | 7/1984 | McGarry et al. | 501/102 |
| 5,023,218 A * | 6/1991 | Zanoli et al. | 501/105 |
| 5,028,572 A | 7/1991 | Kim et al. | |
| 5,086,020 A * | 2/1992 | Ishino et al. | 501/105 |
| 5,344,801 A * | 9/1994 | Kida et al. | 501/105 |
| 5,466,643 A * | 11/1995 | Ishino et al. | 501/105 |
| 5,679,612 A * | 10/1997 | Endo et al. | 501/104 |
| 7,129,192 B2 * | 10/2006 | Boussant-Roux et al. | 501/105 |
| 7,598,195 B2 * | 10/2009 | Gupta et al. | 501/105 |
| 7,655,587 B2 * | 2/2010 | Boussant-Roux et al. | 501/105 |
| 7,687,422 B2 * | 3/2010 | Boussant-Roux et al. | 501/105 |
| 7,842,633 B2 * | 11/2010 | Tomura et al. | 501/105 |
| 2008/0076659 A1 * | 3/2008 | Boussant-Roux et al. | 501/105 |
| 2009/0038936 A1 * | 2/2009 | Boussant-Roux et al. | 204/242 |
| 2009/0176642 A1 * | 7/2009 | Tomura et al. | 501/104 |

FOREIGN PATENT DOCUMENTS

| | | |
|---|---|---|
| EP | 0 403 387 A1 | 12/1990 |
| FR | 1.208.577 | 2/1960 |
| FR | 1.430.962 | 3/1966 |
| JP | 200302560 | * 10/2000 |
| JP | 2004099441 | * 4/2004 |

* cited by examiner

*Primary Examiner* — Karl Group
(74) *Attorney, Agent, or Firm* — Oliff & Berridge, PLC

(57) ABSTRACT

The present invention provides a fused cast refractory block comprising a mean zirconia ($ZrO_2$+$HfO_2$) content of more than 85% as a percentage by weight based on the oxides, and with a standard deviation σ of the local zirconia content divided by the volume of the block of less than 7.5.

19 Claims, 1 Drawing Sheet

FUSED CAST REFRACTORY BLOCK WITH HIGH ZIRCONIA CONTENT

The invention relates to a novel fused cast refractory block with high zirconia content.

PRIOR ART

Fused cast blocks, usually termed electrofused, are conventionally obtained by melting a mixture of appropriate starting materials in an electric arc furnace. Next, the molten liquid is cast into a mold then solidified to form a block.

U.S. Pat. No. 5,028,572 describes a method in which a particulate mixture of starting materials is projected and molten using a plasma torch to form a layer of molten liquid on the surface of a mold. Complete solidification of that liquid is achieved in less than 10 minutes, preferably in less than 5 minutes, more preferably in less than 2 minutes following projection.

The block is then cooled to ambient temperature.

Cooling may be rapid as described in U.S. Pat. No. 5,028,572, where the block is exposed to air or subjected to the action of a circulating cooling fluid. However, rapid cooling results in the appearance of cracks in the block that is produced.

Generally, instead of the rapid cooling described in U.S. Pat. No. 5,028,572, the unmolded block is subjected to slow cooling by annealing. Such cooling can advantageously limit the appearance of cracks.

Fused cast blocks include electrofused blocks with a high zirconia content, i.e. comprising more than 85% by weight of zirconia ($ZrO_2$); they are known for their very good corrosion resistance with no coloration of the glass and with no generation of defects.

The ER-1195 block produced and sold by Société Européenne des Produits Réfractaires and protected by European patent EP-B-0 403 387 is currently widely used in glass fusion furnaces. Its chemical composition comprises about 94% zirconia, 4% to 5% silica, about 1% alumina, 0.3% sodium oxide and less than 0.05% by weight $P_2O_5$. It is typical of blocks with a high zirconia content used for glass furnaces.

In service, the surfaces of the block in contact with the molten glass undergo corrosion. The resulting gradual reduction in thickness that occurs is not uniform, however, and it has been shown that the corrosion leads to highly variable degrees of local reductions in thickness. The service life of the block is over as soon as the localized thinning becomes too great.

Since it is not known which regions have lowered corrosion resistance, it is impossible to accurately predict the service life of the block, i.e. the period during which the block will remain in service. In fact, it is not known which regions have lowered corrosion resistance. Thus, a cautious approach must be taken when evaluating the service life of the block. Further, lack of uniformity of the corrosion results in a reduction in the service life of the block.

Thus, there is a need for large refractory blocks that are suitable for contact with molten glass and that have a service life that is longer and more predictable than with current blocks. This need is more acute when the glass is a highly corrosive glass, in particular glass for plasma screens.

An object of the present invention is to satisfy this need.

SUMMARY OF THE INVENTION

According to the invention, this object is achieved by means of a fused, cast, and annealed refractory block comprising more than 85% (mean) of zirconia ($ZrO_2+Hf_2O$), preferably more than 90%, more preferably more than 93%, and at least 1% of silica ($SiO_2$), as percentages by weight based on the oxides, wherein the homogeneity is such that the standard deviation σ of the local zirconia content "z" divided by the volume V of the block is less than 7.5, preferably less than 7, more preferably less than 6, still more preferably less than 4.

Advantageously, as becomes apparent from the description below, the blocks of the invention corrode in a more uniform manner than the prior art blocks with a high zirconia content and containing silica. Their service life can thus be longer and can be predicted more accurately.

The standard deviation "σ" may be determined by taking "n" samples, selected randomly or at positions distributed through the block, preferably in a substantially regular manner, in the following manner:

$$\sigma = \sqrt{\frac{1}{n}\sum_{i=1}^{n}(z_i - \bar{z})^2}$$

in which:
- $z_i$ denotes the zirconia content, in percentage by weight, in sample "i" of the block; and
- $\bar{z}$ denotes the mean zirconia content, in percentage by weight, in the block, obtained by taking the arithmetic mean of the values $z_i$, i.e.

$$\left(\bar{z} = \frac{1}{n}\sum_{i=1}^{n}z_i\right).$$

Preferably, n is more than 3, preferably more than 5, more preferably more than 10. The sample positions may be determined in a random manner or they may be determined so as to be distributed through the block. Preferably, one or more samples may be extracted from the core of the block at different levels in the block, along the height, the levels being separated by a constant distance, for example 10 cm (centimeter).

Preferably, the refractory blocks of the invention mentioned above also include one, and preferably more, of the following optional characteristics:
- the height of the refractory block is more than 1 m, preferably more than 1.1 m;
- the section of the refractory block, measured transversal to the direction defining its height, is more than 0.02 m² (square meter). In one embodiment, the transverse cross section has a length and/or width of more than 0.15 m;
- the block weighs more than 50 kg (kilogram), preferably more than 250 kg, or even more than 1000 kg;
- the block is cylindrical in shape with a base which may optionally be circular. Its side surface is thus made of the union of all the straight lines with the same direction and intersecting a given curve;
- the block includes a quantity of silica $SiO_2$ of 1% or more, preferably 3% or more, and/or 10% or less, preferably 8% or less;
- the block includes a quantity of alumina $Al_2O_3$ of 0.1% or more, preferably 0.5% or more and/or 2.5% or less, preferably 1.5% or less, more preferably 1% or less, or even 0.85% or less;
- the impurities represent less than 0.5%, preferably less than 0.1%;

more than 85% of the zirconia in the block is monoclinic;
in the core of the block, more than 50% or even more than 70% by number of the zirconia grains are more than 200 μm (micrometers) in size.

The refractory block may have any section measured transverse to the direction defining the height. This section may, for example, be less than 0.25 m², or even less than 0.16 m². In one embodiment, the section has a length and/or width of less than 0.5 m, or even less than 0.40 m.

In one embodiment, for which the highest possible electrical resistivity is desired in addition to the qualities mentioned above, the block may also exhibit one or more of the following preferred characteristics:

the block includes a dopant selected from the group formed by $V_2O_5$, $CrO_3$, $Nb_2O_5$, $MoO_3$, $Ta_2O_5$, $WO_3$, and mixtures thereof;
0.2%≦P, where $$P=2.43V_2O_5+4.42CrO_3+1.66Nb_2O_5+3.07MoO_3+Ta_2O_5+1.91WO_3;$$

the quantity P is 0.5% or more, preferably 0.6% or more, preferably 1.2% or more and/or 3% or less, preferably 2.5% or less, more preferably 1.4% or less; the dopant is selected from $V_2O_5$, $Nb_2O_5$, $Ta_2O_5$, $WO_3$, and mixtures thereof, preferably from $Nb_2O_5$, $Ta_2O_5$ and mixtures thereof;
the quantity of tantalum oxide $Ta_2O_5$ is 0.2% or more, preferably 0.8% or more and/or 3% or less, preferably 1.5% or less, more preferably 0.9% or less;
the quantity of niobium oxide $Nb_2O_5$ is 0.2% or more, preferably 0.4% or more and/or 3% or less, preferably 1.5% or less;
the block includes a quantity of sodium $Na_2O$ and/or potassium $K_2O$ oxides of 1% or less, preferably 0.5% or less, more preferably 0.1% or less, still more preferably 0.05% or less;
the quantity of boron oxide $B_2O_3$ is 1.5% or less, preferably less than 0.8%. Preferably however, the quantity of $B_2O_3$ is more than 0.05%, preferably more than 0.1%, or even more than 0.2%, in particular when $SiO_2<3\%$;
in addition to zirconia $ZrO_2$, silica $SiO_2$ and alumina $Al_2O_3$, the refractory block includes yttrium oxide $Y_2O_3$, tantalum oxide $Ta_2O_5$ or niobium oxide $Nb_2O_5$.

In one embodiment in which improved bubbling resistance is desired in addition to the qualities mentioned in the introduction, in particular at temperatures below 1150° C., the block also exhibits one or more of the following preferred characteristics:

the block includes a dopant selected from the group formed by $Y_2O_3$ and CaO and mixtures thereof;
the quantity of yttrium oxide $Y_2O_3$ is 0.3% or more, preferably 0.5% or more and/or 3% or less, preferably 1.5% or less;
the quantity of calcium oxide CaO is 0.2% or more and/or 2.3% or less.

The invention also provides a glass fusion furnace including a refractory block in accordance with the invention, in particular in a region intended to come into contact with molten glass, for example in the fusion cell, and especially with glass intended for the production of LCD or plasma screens.

The invention also provides a method of producing a block in accordance with the invention, said method comprising the following steps in succession:
a) mixing starting materials to form a starting charge;
b) completely melting said starting charge by means of an induction furnace, until a molten liquid is obtained;
c) solidifying a volume V of said molten liquid to constitute a block preferably with a height of more than 1 m;
d) annealing to ambient temperature.

In step a), a starting charge is constituted in conventional manner so as to enable the refractory block obtained at the end of step d) to have the chemical composition of a block in accordance with the invention.

The invention also provides a block obtained by a method in accordance with the invention.

Unless otherwise mentioned, all of the percentages given in the present description are percentages by weight based on the oxides.

The zirconia $ZrO_2$ percentages mentioned encompass, as it is common practice, the presence of hafnium oxide and thus correspond to $ZrO_2+HfO_2$.

The "height" of a block denotes its largest dimension.

A "block" denotes a mass with at least one dimension in a transverse plane, i.e. perpendicular to its height, of more than 10 cm.

A "fused, cast, and annealed block" denotes a block that has been produced by cooling a molten liquid, conventionally termed a "fused block", the molten liquid having been solidified between walls that provide it with the shape of the block, the solidified block then having undergone an annealing step.

The term "annealing" denotes a step during which a block that has just been formed is cooled, generally to ambient temperature, at a slow rate. With ceramic compositions of the type used in a block in accordance with the invention, the annealing period is generally more than a few hours, or even more than several days. In particular, it depends on the dimensions of the block. To accomplish annealing, it is known to cover the block with an insulating material, for example alumina $Al_2O_3$ or sand.

The size of a zirconia grain in a block of the invention is its largest dimension measured, with an optical microscope, on a polished section of a sample of the block.

BRIEF DESCRIPTION OF THE DRAWING

Other characteristics and advantages of the present invention become apparent from the following detailed description and from a study of the accompanying drawings in which.

DETAILED DESCRIPTION OF THE INVENTION

Figure 1:
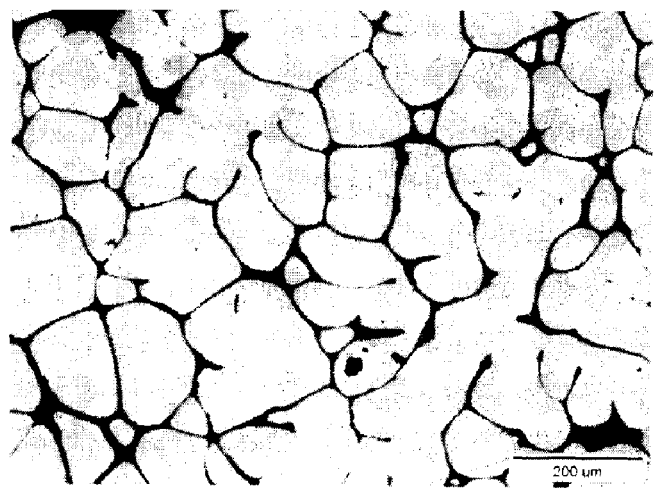
FIGS. 1, 2 and 3 are photographic images of sections of the core of blocks 1, 3, and 3' respectively. The scale in each figure represents a length of 200 μm.

A method comprising above-described steps a) to d) is described below in detail.

In step a), the starting charge is determined so that the refractory block obtained at the end of step d) has more than 85%, preferably more than 90%, more preferably more than 93% zirconia, as a percentage by weight based on the oxides. Such zirconia contents guarantee excellent corrosion resistance.

The Hafnium oxide $HfO_2$ present in the block of the invention is the hafnium oxide that is naturally present in zirconia sources. The quantity of it in the block of the invention is thus 5% or less, generally 2% or less.

Silica must be present in order to form an intergranular vitreous phase that can effectively accommodate variations in the volume of the zirconia during its reversible allotropic transformation, i.e. during passage from the monoclinic phase into the tetragonal phase. Preferably, the silica content in the block is more than 1.5%, 2.0% or more, 2.5% or more, or even 3.0% or more. Advantageously, such silica contents can avoid cracks forming when the block is produced, and also during use of the block.

In contrast, the added silica must not exceed 10% since that would reduce the zirconia content, and thereby reduce corrosion resistance.

The presence of alumina is necessary for the formation of a stable vitreous phase. An excessive amount causes instability of the vitreous phase (crystal formation).

When the block is intended for applications where high electrical resistivity is desired, the amounts of oxides of sodium $Na_2O$ and/or potassium $K_2O$ are preferably 1% or less, preferably 0.5% or less. Preferably, the blocks of the invention then include only traces of $Na_2O$ and $K_2O$. In fact, the presence of these oxides has a deleterious effect on electrical resistivity because of the low resistivity of the vitreous phase.

In these applications, it is also preferable that the block of the invention include a dopant selected from the group formed by $V_2O_5$, $CrO_3$, $Nb_2O_5$, $MoO_3$, $Ta_2O_5$, $WO_3$, and mixtures thereof, preferably selected from $V_2O_5$, $Nb_2O_5$, $Ta_2O_5$, $WO_3$, and mixtures thereof, more preferably from $Nb_2O_5$, $Ta_2O_5$, and mixtures thereof.

Preferably, $0.2\% \leq P$, preferably $0.5\% \leq P$, more preferably $0.6\% \leq P$, still more preferably $1.2\% \leq P$ and/or $P \leq 3\%$, preferably $P \leq 2.5\%$, and still more preferably $P \leq 1.4\%$, in which:

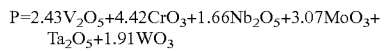

$$P = 2.43V_2O_5 + 4.42CrO_3 + 1.66Nb_2O_5 + 3.07MoO_3 + Ta_2O_5 + 1.91WO_3$$

In particular, it is preferable for the quantity of tantalum oxide $Ta_2O_5$ to be 0.2% or more, preferably 0.8% or more and/or 3% or less, preferably 1.5% or less, and for the quantity of niobium oxide $Nb_2O_5$ to be 0.2% or more, preferably 0.4% or more and/or 3% or less, preferably 1.5% or less.

Adding these dopants in proportions which satisfy these preferred conditions produces remarkable electrical resistivity while keeping the molten glass corrosion resistance good. The refractory product of the invention may thus have an electrical resistivity of 200 Ω.cm (ohm.centimeter) or more or even 400 Ω.cm or more at 1500° C. at a frequency of 100 Hz (Hertz).

When the block is intended for applications in which good resistance to bubbling is required, it is advantageous to add a dopant selected from $Y_2O_3$ and CaO to the starting charge. The quantity of yttrium oxide $Y_2O_3$ is preferably 0.3% or more, preferably 0.5% or more and/or 3% or less, preferably less than 1.5%. The quantity of calcium oxide CaO is preferably 0.2% or more and/or 2.3% or less.

In all embodiments, the constituents are preferably added systematically and methodically, especially the dopant or dopants, to the starting charge in a manner that guarantees the amount of these constituents in the block.

The complement to 100% of the total sum of the amounts of zirconia, silica, alumina, and dopant in the composition of the block of the invention is constituted by the "other species". The term "other species" means species the presence of which is not particularly desired. The "other species" are preferably the only impurities deriving from the starting materials.

Preferably, the starting materials are selected so that the total amount of "other species" in the fused block is less than 0.6%, preferably less than 0.2%. In such amounts, it is assumed that the "other species" do not substantially modify the results obtained.

The following can be mentioned: oxides of iron, titanium and phosphorus which are known to impair performance. They must be limited in quantity to traces introduced as impurities with the starting materials. Preferably:
the quantity of $Fe_2O_3 + TiO_2$ is less than 0.55%;
the quantity of $P_2O_5$ is less than 0.05%.

In step b), melting is carried out using an induction furnace, preferably in air.

Such a furnace avoids contamination with carbon deriving from the electrodes, as occurs with arc furnaces. It can also achieve complete melting of the starting charge and thus produce a highly homogeneous molten liquid.

An induction furnace can also carry out continuous melting and solidification with, in continuous mode, a solidification front that is substantially stationary in position, and that is in permanent contact with the molten liquid in the melt zone. The block can thus be produced without a costly molding operation. Above all, it can be constituted slowly, with the hardening of each point of the block being carried out under substantially identical temperature and temperature gradient conditions. Thus, the induction furnace allows large blocks to be produced with a microstructure that is particularly homogeneous.

Preferably, a furnace of the type described in French patent FR-A-1 430 962 is used, hereby incorporated by reference, operating at a power in the range 100 kW (kilowatt) to 1000 kW and a frequency delivered by the aperiodic generator in the range 50 kHz (kilohertz) to 250 kHz. The molten liquid thus reaches a temperature of more than 2600° C.

FR-A-1 430 962 describes a process wherein an initially granular pulverulent oxide or mixture of oxides is continuously passed through a melting zone which comprises a heating source and in which the oxide is heated by high-frequency electric induction, and then through a solidifying zone immediately downstream of the melting zone, the speed of the movement of the material at the outlet from the melting zone being such that taking into account the heat input to the melting zone and the heat loss immediately after leaving the melting zone, a solidification front is produced which is fixed in space and which is in permanent contact with the liquid material in the melting zone. This process obviates all transference of a volume of liquid from one receptacle to another, and obviates molding.

In general, it is important for solidification to occur by a solidification front separating a liquid region from a hardened region and advancing relative to two opposite faces of the block. The solidification front, which is preferably stationary in position as described in FR-A-1 430 962, may be localized at least in part in a fusion zone of the furnace.

Preferably again, fusion and solidification are continuous.

During formation of the block (while a liquid region exists), cooling downstream of the solidification front, i.e. cooling of the hardened region, may be controlled so that it is as slow as possible. The block production device may thus comprise means that ensure a cooling rate in the hardened region, during formation of the block, that, for example, is less than 100° C./h (degrees Celsius per hour), or even less than 50° C./h. These means may include lagging and/or heating means.

The block may have a transverse cross section of any area, and especially of more than 0.04 m². In one embodiment, the transverse cross section has a length and/or width of more than 0.20 m. The area of the transverse cross section may also be less than 0.16 m². In one embodiment, the section has a length and/or width of less than 0.40 m.

Preferably, the height of the refractory block is over 1 m, preferably more than 1.1 m.

Following complete solidification, the block undergoes a complementary annealing step d) during which the temperature is gradually brought to ambient temperature, the cooling rate remaining less than 20° C. per hour, or less than 15° C. per hour, preferably about 10° C. per hour.

Preferably, annealing is carried out by covering the block with a powder of alumina or sand.

Surprisingly, the inventors have established that using an induction furnace that allows solidification by advance of a solidification front separating a liquid region from a hardened region, leads to a block in which the surface that comes into contact with molten glass wears in a manner that is uniform, thereby considerably improving the service life of the block and the predictability of this service life.

EXAMPLES

Without wishing to be bound by one theory, the inventors consider that the performance of the blocks of the invention results from a particularly regular distribution of the zirconia within the block, as can be seen in the following examples.

In these examples, the following starting materials were used:
zirconia principally containing, as a mean by weight, 98.5% of $ZrO_2$+$HfO_2$, 0.2% of $SiO_2$, and 0.02% of $Na_2O$;
silica sand containing 99% silica;
AC44 type alumina sold by Pechiney and containing on average 99.4% alumina $Al_2O_3$;
sodium carbonate $Na_2CO_3$;
oxides of boron, yttrium, tantalum $Ta_2O_5$, and niobium $Nb_2O_5$ with a purity of more than 99%.

A block 1 was prepared using the conventional electric arc furnace fusion method followed by casting to obtain a block with format 260×440×1200 mm (millimeter). The long arc fusion method used was that described in French patent FR-A-1 208 577 and its patents of addition numbers 75893 and 82310, herewith incorporated by reference.

FR-A-1 208 577 describes a process for preparing refractory products by melting in an electrical furnace of a charge made of one or several mineral oxides, wherein the melting heat is provided by an electrical arc outside the charge. The arc spurts out between the charge and at least one electrode aside from the charge, and its length is adjusted for its reduction action to be lowered to a minimum. The arc is sufficiently long between the charge and the electrodes for the carbon coming from the electrodes to be burnt such that the reduction action lowers, at least when the arc spurts out in an oxidizing atmosphere, for example in air. In addition, the molten charge is submitted to a mixing.

Blocks 2 to 8 were prepared using a method in accordance with the invention using an induction fusion furnace as described above, and similar to that described in FR-A-1 430 962, with a variable diameter coil adapted to the desired format for a block, power in the range 100 kW to 1000 kW, and at a frequency delivered by the aperiodic generator in the range 50 kHz to 250 kHz. For Examples 5 to 8, the coil had a diameter of 275 mm.

For each block 2 to 4, cylindrical samples with a diameter of 30 mm and length of 40 mm were taken from the center of the block at different heights, every 100 mm, including the upper and, as appropriate, lower surfaces of the block. All of the minor species were measured by chemical analysis. The percentage of zirconia $ZrO_2$+$HfO_2$ constitutes the complement to 100% of sum total of the minor species.

The chemical analyses are given as percentages by weight.

The homogeneity index "Ih" is equal to the standard deviation for the percentage of zirconia "σ" divided by the volume "V" of the bloc, in m×m×m:

Ih=σ/V, in which $$\sigma = \sqrt{\frac{1}{n}\sum_{i=1}^{n}(z_i - \bar{z})^2} \ ;$$

$z_i$ denotes the zirconia content, in percentage by weight, in sample "i" of the block;
$\bar{z}$ denotes the mean zirconia content, in percentage by weight, in the block obtained by taking the arithmetic mean of the values $z_i$;
n denotes the number of samples taken from the block as a function of the height H under consideration (n=H/0.1+1); and
V denotes the volume of the block, in m³.

The block 3 was obtained by sawing a block with a section of 500 mm×400 mm.

The dimensions of the blocks and the results of the analyses are given in Tables 1 and 2 below.

TABLE 1

| | | Average chemical analysis for a height H = 1200 mm (percentages by weight based on the oxides) | | | | | |
|---|---|---|---|---|---|---|---|
| Block | Section (mm × mm) | $ZrO_2$ + $HfO_2$ | $SiO_2$ | $Al_2O_3$ | $Na_2O$ | $Y_2O_3$ | $Fe_2O_3$ + $TiO_2$ |
| 1* | 260 × 440 | 95.63 | 2.93 | 0.88 | 0.17 | 0.15 | 0.14 |
| 2 | 300 × 400 | 95.01 | 3.23 | 1.06 | 0.22 | 0.19 | 0.19 |
| 3 | 250 × 400 | 95.55 | 3.04 | 0.78 | 0.20 | 0.19 | 0.14 |
| 4 | 400 × 500 | 94.15 | 4.11 | 1.00 | 0.26 | 0.19 | 0.17 |

*not in accordance with the invention.

TABLE 2

| | Chemical analysis to a height H = 800 mm | | | Chemical analysis to a height H = 1000 mm | | | Chemical analysis to a height H = 1200 mm | | |
|---|---|---|---|---|---|---|---|---|---|
| | Mean ($\bar{z}$)(%) | Std dev | Ih | Mean ($\bar{z}$)(%) | Std dev | Ih | Mean ($\bar{z}$)(%) | Std dev | Ih |
| 1* | 94.34 | 1.172 | 12.81 | 95.79 | 1.141 | 9.97 | 95.63 | 1.094 | 7.97 |
| 2 | 95.30 | 0.442 | 4.60 | 95.17 | 0.581 | 4.84 | 95.01 | 0.800 | 5.56 |

TABLE 2-continued

| | Chemical analysis to a height H = 800 mm | | | Chemical analysis to a height H = 1000 mm | | | Chemical analysis to a height H = 1200 mm | | |
|---|---|---|---|---|---|---|---|---|---|
| | Mean $(\bar{z})$ (%) | Std dev | Ih | Mean $(\bar{z})$ (%) | Std dev | Ih | Mean $(\bar{z})$ (%) | Std dev | Ih |
| 3 | 95.75 | 0.215 | 2.69 | 95.69 | 0.248 | 2.48 | 95.55 | 0.414 | 3.45 |
| 4 | 95.12 | 0.599 | 3.74 | 94.58 | 1.328 | 6.64 | 94.15 | 1.617 | 6.75 |

*not in accordance with the invention.

It can be seen that the blocks of the invention have an index Ih of less than 7 and even less than 6 for blocks with a transverse cross section of less than 0.15 m².

This homogeneous distribution of the zirconia could explain the substantially uniform wear of the blocks of the invention when they are subjected to highly corrosive conditions, and thus their remarkable service life. These blocks are well suited to being brought into contact with very high quality glass such as glass for flat LCD type screens or for plasma screens.

With the invention, it is possible to produce blocks having a large section and a high zirconia content. These blocks are highly homogeneous over their height, as regards chemical composition and thus for all of their properties, in particular electrical resistivity and expansion. This means that the section of these large blocks can be cut, thereby increasing productivity. It is also possible to envisage cutting these large blocks lengthwise (shortening their height) since the index Ih is satisfactory at all heights.

For the various blocks 5 to 8, cylindrical bars of product having a diameter of 30 mm and a height of 30 mm were subjected to a potential difference of 1 V (volt) at a frequency of 100 Hz at 1500° C. to carry out the electrical resistivity measurements R.

In Table 3, a blank space corresponds to a quantity of 0.05% by weight or less.

TABLE 3

| | ZrO$_2$ | SiO$_2$ | B$_2$O$_3$ | Al$_2$O$_3$ | Al$_2$O$_3$/SiO$_2$ | Na$_2$O | Nb$_2$O$_5$ | Ta$_2$O$_5$ | Y$_2$O$_3$ | Ta$_2$O$_5$ + 1.66 Nb$_2$O$_5$ | R (Ω · cm) |
|---|---|---|---|---|---|---|---|---|---|---|---|
| 5 | 94.0 | 3.7 | 0.3 | 0.8 | 0.22 | | | | 1.2 | 1.2 | 448 |
| 6 | 94.9 | 3.5 | 0.3 | 0.8 | 0.23 | | 0.5 | | | 0.8 | 460 |
| 7 | 94.6 | 3.6 | 0.2 | 0.8 | 0.22 | | 0.8 | | | 1.3 | 429 |
| 8 | 93.3 | 4.2 | 0.3 | 1.1 | 0.26 | | 0.5 | 0.6 | | 1.4 | 370 |

Table 3 shows that the addition of certain dopants can produce high electrical resistivity.

The invention thus allows the production of large blocks that have a high zirconia content that is well distributed within a block, as well as remarkable resistivity.

Further, a block 3' with the same composition and with the same dimensions as the block 3, was produced like the block 3, but without an annealing step. Block 3' was cooled in the open air as described in U.S. Pat. No. 5,028,572. After cooling, block 3' had a through crack which rendered it unusable, in contrast to block 3 which had undergone annealing.

Figure 2:
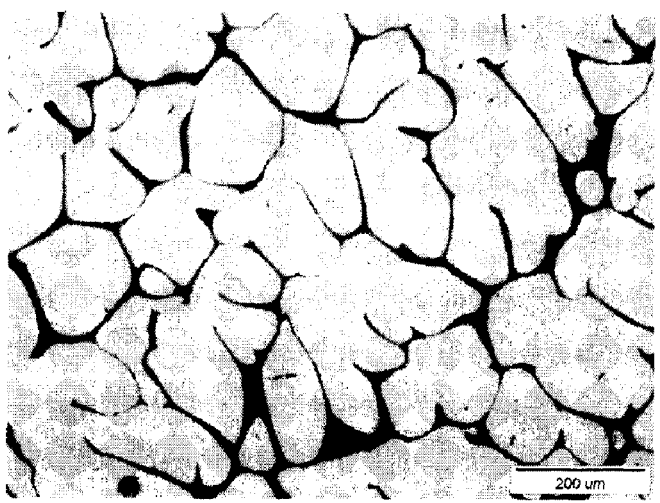
Figure 3:
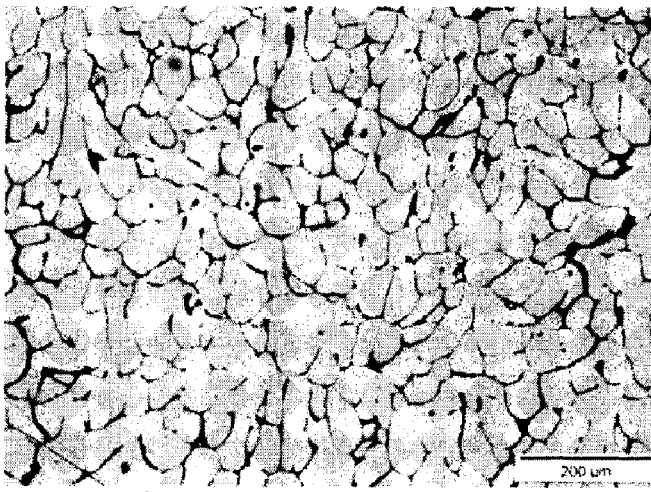

Further, as shown in FIGS. 1, 2 and 3, the microstructure of blocks 1, 3, and 3' exhibits zirconia grains surrounded by a vitreous face. The zirconia grains of Example 3' are, however, much smaller than those of Examples 1 and 3.

Preferably, in the core of a block of the invention, more than 50% by number, or even more than 70% by number, of the zirconia grains are more than 200 μm in size.

Clearly, the present invention is not limited to the embodiments described and shown by way of non-limiting illustration.

The invention claimed is:

1. A fused, cast, and annealed refractory block comprising a mean zirconia ($ZrO_2$+$HfO_2$) content of more than 85% and a silica $SiO_2$ content of 1% or more, as a percentage by weight based on the oxides, wherein the standard deviation σ of the local zirconia content divided by the volume of the block is less than 7.5, the standard deviation σ being evaluated by taking "n" samples, selected randomly or at positions distributed in the block, as follows:

$$\sigma = \sqrt{\frac{1}{n}\sum_{i=1}^{n}(z_i - \bar{z})^2}$$

in which:
$z_i$ denotes the zirconia content, in percentage by weight, in sample "i" of the block; and
$\bar{z}$ denotes the mean zirconia content, in percentage by weight, in the block, obtained by taking the arithmetic mean of values $z_i$.

2. A block according to claim 1, in which the standard deviation σ of the local zirconia content divided by the volume of the block is less than 6.

3. A block according to claim 2, in which the standard deviation σ of the local zirconia content divided by the volume of the block is less than 4.

4. A block according to claim 1, having a height of more than 1 m.

5. A block according to claim 1, having a section, measured transverse to the direction defining the height, of more than 0.02 m² and/or less than 0.25 m².

6. A block according to claim 1 in which, as percentages by weight based on the oxides:
$ZrO_2 \geq 90\%$; and/or
$SiO_2 \leq 10\%$; and/or
$Al_2O_3 \geq 0.1\%$; and/or $Al_2O_3 \leq 2.5\%$.

7. A block according to claim 6 in which, as a percentage by weight based on the oxides:
$ZrO_2 \geq 93\%$; and/or
$SiO_2 \geq 3\%$; and/or $SiO_2 \leq 8\%$; and/or
$Al_2O_3 \geq 0.5\%$ and/or $Al_2O_3 \leq 1.5\%$.

8. A block according to claim 1, comprising a dopant selected from the group consisting of $V_2O_5$, $CrO_3$, $Nb_2O_5$, $MoO_3$, $Ta_2O_5$, $WO_3$, and mixtures thereof, the dopant content being such that, as a percentage by weight based on the oxides:

$$0.2\% \geq 2.43V_2O_5+4.42CrO_3+1.66Nb_2O_5+3.07MoO_3+Ta_2O_5+1.91WO_3.$$

9. A block according to claim 8, in which:

$$0.5\% \geq 2.43V_2O_5+4.42CrO_3+1.66Nb_2O_5+3.07MoO_3+Ta_2O_5+1.91WO_3;$$

and/or $$2.43V_2O_5+4.42CrO_3+1.66Nb_2O_5+3.07MoO_3+Ta_2O_5+1.91WO_3 \leq 3\%.$$

10. A block according to claim 8, in which:
$Ta_2O_5 \geq 0.2\%$; and/or $Ta_2O_5 \leq 3\%$; and/or
$Nb_2O_5 \geq 0.2\%$; and/or $Nb_2O_5 \leq 3\%$.

11. A block according to claim 1 in which, as percentages by weight based on the oxides:
$Y_2O_3 \geq 0.3\%$; and/or $Y_2O_3 \leq 3\%$; and/or
$Na_2O+K_2O \leq 1\%$; and/or
$B_2O_3 \geq 0.05\%$; and/or $B_2O_3 \leq 1.5\%$.

12. A block according to claim 11, in which:
$Y_2O_3 \geq 0.5\%$; and/or $Y_2O_3 \leq 1.5\%$; and/or
$Na_2O+K_2O \leq 0.5\%$; and/or
$B_2O_3 \geq 0.1\%$; and/or $B_2O_3 \leq 0.8\%$; and/or
$Ta_2O_5 \geq 0.8\%$; and/or $Ta_2O_5 \leq 1.5\%$; and/or
$Nb_2O_5 \geq 0.4\%$; and/or $Nb_2O_5 \leq 1.5\%$.

13. A block according to claim 1, in which more than 85% of the zirconia is monoclinic.

14. A block according to claim 1 in which, in the core of the block, more than 50%, by number, of the zirconia grains are more than 200 µm in size.

15. A method of placement in a glass furnace, comprising providing a block according to claim 1 in a region of the glass furnace where the block is susceptible of coming into contact with molten glass.

16. A block according to claim 1, obtained by a method comprising the following steps in succession:
   a) mixing starting materials to form a starting charge;
   b) completely melting said starting charge by means of an induction furnace, until a molten liquid is obtained;
   c) solidifying a volume V of said molten liquid to constitute a block; and
   d) annealing to ambient temperature.

17. A block according to claim 16, said induction furnace carrying out continuous melting and solidification.

18. A block according to claim 17, said solidification resulting from the advance of a solidification front separating a liquid region from a hardened region.

19. A block according to claim 16, wherein the block has a height of more than 1 m.

* * * * *